United States Patent [19]

Kitajima et al.

[11] 4,072,211
[45] Feb. 7, 1978

[54] DRIVING DEVICE FOR A MOVING BODY

[75] Inventors: Tadayuki Kitajima, Yokohama; Yoshikuni Tohyama, Tokyo, both of Japan

[73] Assignee: Canon Kabushiki Kaisha, Tokyo, Japan

[21] Appl. No.: 697,127

[22] Filed: June 17, 1976

[30] Foreign Application Priority Data

July 1, 1977 Japan .................................. 50-81194

[51] Int. Cl.² .............................................. F03G 1/00
[52] U.S. Cl. .............................. 185/40 R; 192/48.92
[58] Field of Search ............ 185/39, 40 R; 192/84 A, 192/105 B

[56] References Cited

U.S. PATENT DOCUMENTS

| 613,966 | 11/1898 | Carlsen | 185/40 H |
|---|---|---|---|
| 1,208,455 | 12/1916 | Bedford | 185/39 M |
| 2,362,676 | 11/1944 | Stechbart | 192/105 B |
| 2,965,393 | 12/1960 | Cauchon | 185/39 |
| 3,137,366 | 6/1964 | Rassier | 185/39 |
| 3,172,514 | 3/1965 | Hansen | 192/84 A |
| 3,308,907 | 3/1967 | Bodkin | 185/39 |

Primary Examiner—Benjamin W. Wyche
Assistant Examiner—Wesley S. Ratliff
Attorney, Agent, or Firm—Fitzpatrick, Cella, Harper & Scinto

[57] ABSTRACT

A driving device for a moving body comprises a drive shaft normally rotated in one direction by a drive source, a follower shaft in engagement with the drive shaft to transmit the drive to the moving body, one-way connecting means loosely mounted on the drive shaft to connect and disconnect the drive of the drive shaft to the follower shaft, and accumulator means for accumulating the returning force of the moving body by utilizing the movement of the moving body resulting from the normal rotation of the follower shaft. The follower shaft may be reversed in rotation by the accumulator means upon disconnection of the one-way connecting means and the speed of the reverse rotation of the follower shaft is controlled by operation of the one-way connecting means so as not to exceed the driving speed of the drive shaft.

4 Claims, 4 Drawing Figures

DRIVING DEVICE FOR A MOVING BODY

BACKGROUND OF THE INVENTION

1. Field of the Invention

This invention relates to a driving device for a moving body which effects forward and returning movements.

2. Description of the Prior Art

For example, in electrophotographic copying machines, an image original and a photosensitive medium are fixed in parallel relationship with each other and a movable optical system is reciprocally moved therebetween, whereby an optical image corresponding to the image original is projected upon the photosensitive medium to accomplish the exposure thereof.

Also, in copying machines wherein the optical system is stationary, an original carriage for supporting thereon an image original and a photosensitive medium are respectively moved to effect exposure.

The conventional means for effecting the forward movement of such a moving body at a predetermined speed and for effecting the returning movement thereof include those of the following types:

1. The type which controls both the forward and returning movements of the moving body by means of a clutch;
2. The type which controls only the forward movement by means of a clutch and controls the returning movement by a motive power; and
3. The type which controls only the forward movement by means of a clutch and controls the returning movement by the resilient force of a coil spring.

The control method mentioned under item (1) above is disadvantageous in that when reversed from its forward movement, the moving body suffers from a great shock since the speed of the returning movement is usually higher than that of the forward movement.

In the control method mentioned under item (2) above, the use of the motive power of a motor or the like to return the moving body results in a lower rising speed of the returning movement as indicated by a curve 1 in FIG. 1 of the accompanying drawings and this could not be said to be an effective method but was expensive.

The control method of item (3) above is inexpensive and simple in instrumentation, but the resilient force of the coil spring causes sharp acceleration of the moving body which continues until the moving body reaches its stopping position, as indicated by a curve 2 in FIG. 1, so that the moving body experiences a great shock at the stopping position. To alleviate such a shock, this method undesirable involves the necessity of providing a shock absorber which is complex and expensive. Especially, in an optical system of the type wherein the original carriage is movable, such a shock makes the position of the image original unstable.

SUMMARY OF THE INVENTION

It is an object of the present invention to provide a driving device for a moving body which uses a coil spring for the returning movement of the moving body but utilizes a simple mechanism to control the speed of the returning movement of the moving body as indicated by a curve 3 in FIG. 1, thereby increasing the rising speed at the start of returning movement of the moving body and reducing the shock thereof during the stoppage.

Generally described, the present invention provides a control device which comprises at least two connecting means such as clutches loosely mounted on a drive shaft rotatable at a predetermined speed in one direction. One of the connecting means may be, for example, an electromagnetic clutch for connecting and disconnecting the drive of the drive shaft to a follower shaft which may impart a drive to a moving body, and the other connecting means may be one-way connecting means which is connectible to the drive shaft only when the follower shaft tends to be rotated at a higher speed than that of the drive shaft. Thus, the rotation of the follower shaft may be reversed by a force accumulated therein during the normal rotation of the follower shaft and the speed of the reverse rotation of the follower shaft may be controlled by operation of the one-way connecting means so as not to exceed the rotational speed of the drive shaft.

A point which should be sufficiently taken into consideration in such a device is that the overall inertia of members (pulleys, gears, etc.) moved and driven by the spring during the returning movement must be minimized. More specifically, in such construction, it is important that the pulley drive force imparted by the return force of the spring should be intactly and directly transmitted to one-way transmission means. If a number of transmission means such as gears or the like intervene there, the spring force which should act at the start of the returning movement will be greatly reduced by the inertia of those transmission means so that smooth reciprocal movement will be hampered.

According to the present invention, the shock of the moving body during the reversal thereof is not great because the reversal is accomplished by the accumulated force, and moreover, the rising speed of the returning movement of the moving body is higher.

Thus, the device of the present invention eliminates the necessity of providing any shock absorber means and may be constructed simply and expensively and accordingly, highly practical.

The invention will become more fully apparent from the following detailed description thereof taken in conjunction with the accompanying drawings.

DESCRIPTION OF THE PREFERRED EMBODIMENTS

The invention as applied to an electrophotographic copying apparatus will hereinafter be described with respect to an embodiment thereof.

Figure 2:
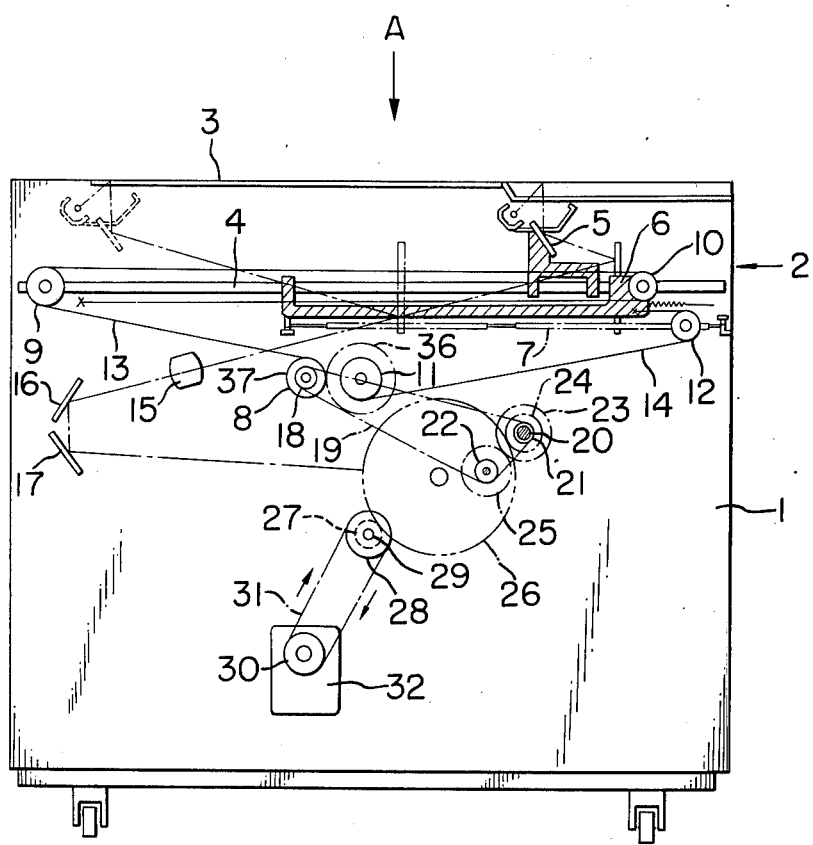
FIG. 2 is a vertical cross-sectional view showing an example of the copying machine equipped with the driving device of the present invention.

Referring to FIG. 2, the copying machine body generally designated by 1 has a movable optical system 2 disposed in the upper portion thereof, and an original supporting glass plate 3 is securely provided on top of the machine body. The movable optical system 2 comprises: a reciprocally movable first mirror 5 provided with two rails 4 (only one of which is shown) parallel to the original supporting glass plate 3 and to each other and an illumination means, the first mirror 5 being reciprocable on the two rails, a second mirror 6 reciprocally movable at half the speed of the first mirror, an optical system returning spring 7 having one end secured to the second mirror, pulleys 8-12 and wires 13-14 for driving the first and the second mirror 6, a lens 15 securely disposed on the optical path, a third mirror 16 and a fourth mirror 17, both being also securely disposed on the optical path. Further, an optical sprocket 18 formed integrally with the driving pulley 8 for driving the optical system is connected by a chain 19 to an optical driving sprocket 21 on an optical driving shaft 20 and to a follower sprocket 22. An optical driving gear 24 is securely mounted on the optical driving shaft 20 and meshes with a drum gear 26 for rotating a photosensitive drum 33. The drum gear 26 may be driven from a drive motor through a drum driving gear 27, a drum driving sprocket 28, a chain belt 31 and a drive motor sprocket 30.

Figure 3:
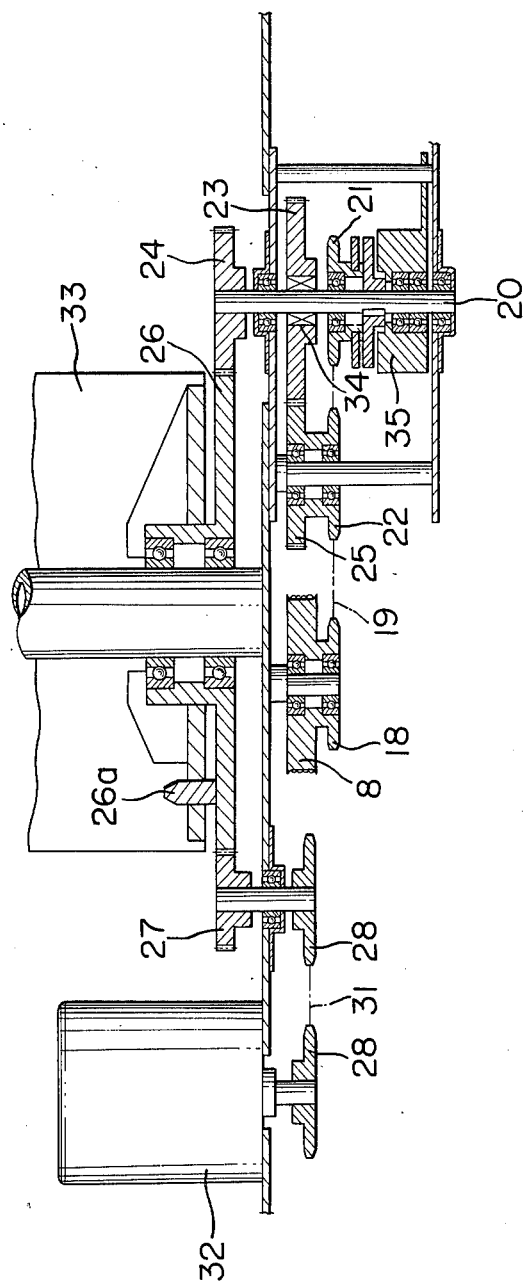
FIG. 3 is a cross-sectional view of the photosensitive drum driving portion in the FIG. 2 machine.

FIG. 3 is a cross-sectional view of the photosensitive drum driving portion in FIG. 2 taken along the direction of arrow A.

Operation will now be described by reference to FIGS. 2 and 3.

The reflected light from an image original is projected upon the peripheral surface of the photosensitive drum 33 which is rotatably mounted on a fixed shaft and connected by a pin 26a to the drum gear 26 which is also mounted on the same fixed shaft, so that the photosensitive drum and the drum gear 26 are rotatable together. The drive of the drive motor is transmitted to the drum gear by way of the drum driving gear, the drum driving sprocket and the drum driving chain. The drive motor is normally in rotation during the operation (copying operation) of the machine. Whenever the copying operation is started by closing a main switch, the photosensitive drum and the drum gear are rotated in a predetermined direction by the drive motor and the optical driving shaft 20 receives the drive from the drum gear 26 through the optical driving gear 24 securely mounted on the same shaft. The optical driving sprocket 21 for driving the optical system is loosely mounted on the driving shaft 20 with a magnet clutch 35 interposed therebetween, and rotated with the driving shaft by the operation of the magnet clutch to cause the chain 19 to rotate the optical sprocket 18, thus rotating the driving pulley 8 integral with the sprocket 18 to start the optical system. At the same time, the follower sprocket 22 meshing with the optical chain 19 is also rotated so that a follower gear 25 integral with the sprocket 22 drives a driven gear 23 on the optical driving shaft 20. The rotational directions of the driven gear 23 and the driving shaft 20 are opposite to each other, but the driving shaft 20 is not then engaged by the one-way clutch 34 which intervenes between the drum gear 23 and the driving shaft 20.

Subsequently, the first and the second mirror of the optical system completes the scanning up to a predetermined position, whereupon the magnet clutch 35 is released to liberate the optical driving sprocket 21 on the normally rotating optical driving shaft 20. By the compression force of the optical return spring 7, the first and the second mirror start to return and the driving pulley 8 is rotated in the opposite direction to that during the forward movement of the optical system, so that the optical sprocket 18 integral with the pulley 8 causes the chain 19 to rotate the driven sprocket 22 and the optical driving sprocket 21 in the opposite direction to that during the forward movement of the optical system. Further, the follower gear 25 integral with the follower sprocket 22 rotates the follower gear 23 in the opposite direction to that during the forward movement of the optical system. This rotational direction of the follower gear 23 is the same as the rotational direction of the normally rotating optical driving shaft 20. At this time, the driven gear 23 is in the direction which permits the one-way clutch 34 to engage the optical driving shaft 20, so that the rotational speed of the gear 23 cannot exceed the rotational speed of the optical driving shaft 20.

Thus, when the driving shaft 20 is rotating at a predetermined speed and in a predetermined direction throughout the forward and returning movements of the optical system, the speeds of the first and the second mirror which tend to be abruptly returned by the resilient force of the optical return spring 7 are controlled.

According to an embodiment of the present invention, as described above, the movable optical system (the first and second mirrors) has a predetermined speed during its forward movement and is returned to its starting position with its returning movement also controlled to a predetermined speed, so that the shock at the stopping position imparted by the return spring is prevented. The speed of returning movement of the movable optical system may be suitably determined by suitably selecting the gear ratio of the follower gears 25 and 23, but also may be suitably adjusted by suitably selecting the rotational speed of the optical driving shaft 20, the number of teeth of the optical driving sprocket 21 and the number of teeth of the follower sprocket 22 integral with the follower gear 25.

Figure 1:
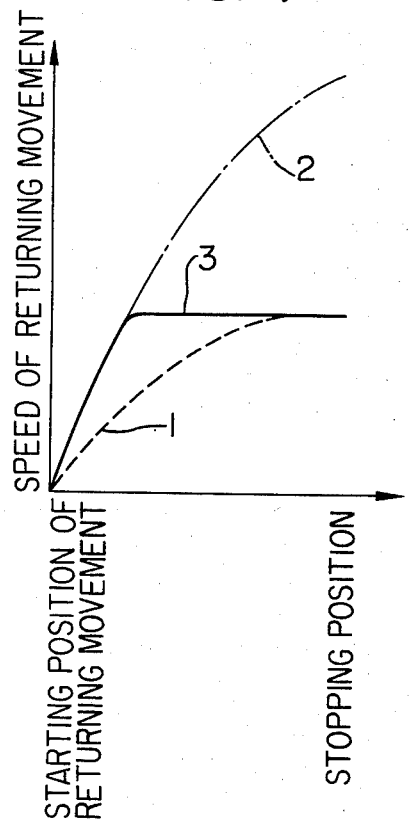
FIG. 1 is a graph illustrating the relation between the speed of returning movement and the stopping position of the moving body.
Figure 4:
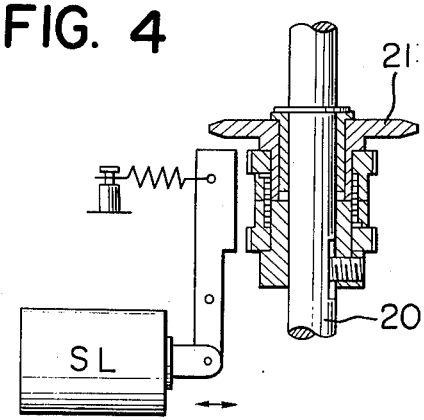
FIG. 4 is a vertical cross-sectional view of the spring clutch portion in the device.

Further, according to the embodiment of FIG. 2, during the returning movement of the movable optical system, the wire 14 having one end secured to the second mirror is wound on the pulley 11 by way of the pulley 12 to bring the gear 36 integral with the pulley 11 into meshing engagement with the gear 37 integral with the pulley 8, whereby slackening of the wire 13 is prevented during the stoppage of the movable optical system, but an entirely equivalent function may be provided by using simple and inexpensive locking means which will act on the pulley 8 or any of the sprockets 18, 21 and 22 only during the stoppage of the optical system. Further, the magnet clutch 35 as shown in FIG. 3 may be replaced by a spring clutch as shown in FIG. 4, resulting in optainment of a function entirely equivalent to that of the magnet clutch.

We claim:
1. A driving device for a moving body comprising:
a drive shaft normally rotated in one direction by a drive source;
a follower shaft in engagement with said drive shaft to transmit a driving force to the moving body;
first connecting means loosely mounted on said drive shaft to connect and disconnect the driving force of said drive shaft to said follower shaft;
accumulator means for accumulating a backwardly moving force for said moving body by utilizing the movement of the moving body resulting from the rotation of said follower shaft in a forward direction; and
one-way connecting means loosely mounted on said drive shaft to connect with said drive shaft only when a rotational speed of said follower shaft in the backward direction is greater than that of the drive shaft;

said follower shaft being driven into reverse rotation by said accumulator means upon disconnection of said first connecting means and the speed of the reverse rotation of said follower shaft being controlled by operation of said one-way connecting means so as not to exceed the driving speed of said drive shaft, thereby maintaining a constant rotational speed thereof.

2. A driving device according to claim 1, wherein said accumulator means is a spring.

3. A driving device according to claim 1, wherein said engagement between said drive shaft and said follower shaft is established by means of a gear.

4. A driving device according to claim 2, wherein one end of said spring is secured to a portion of the moving body and the other end is secured to an immovable portion.

* * * * *